F. KUHN, L. H. THOMAS AND J. G. SPIESS.
ELECTRICALLY HEATED TOOL.
APPLICATION FILED MAY 27, 1920.
1,353,965.
Patented Sept. 28, 1920.
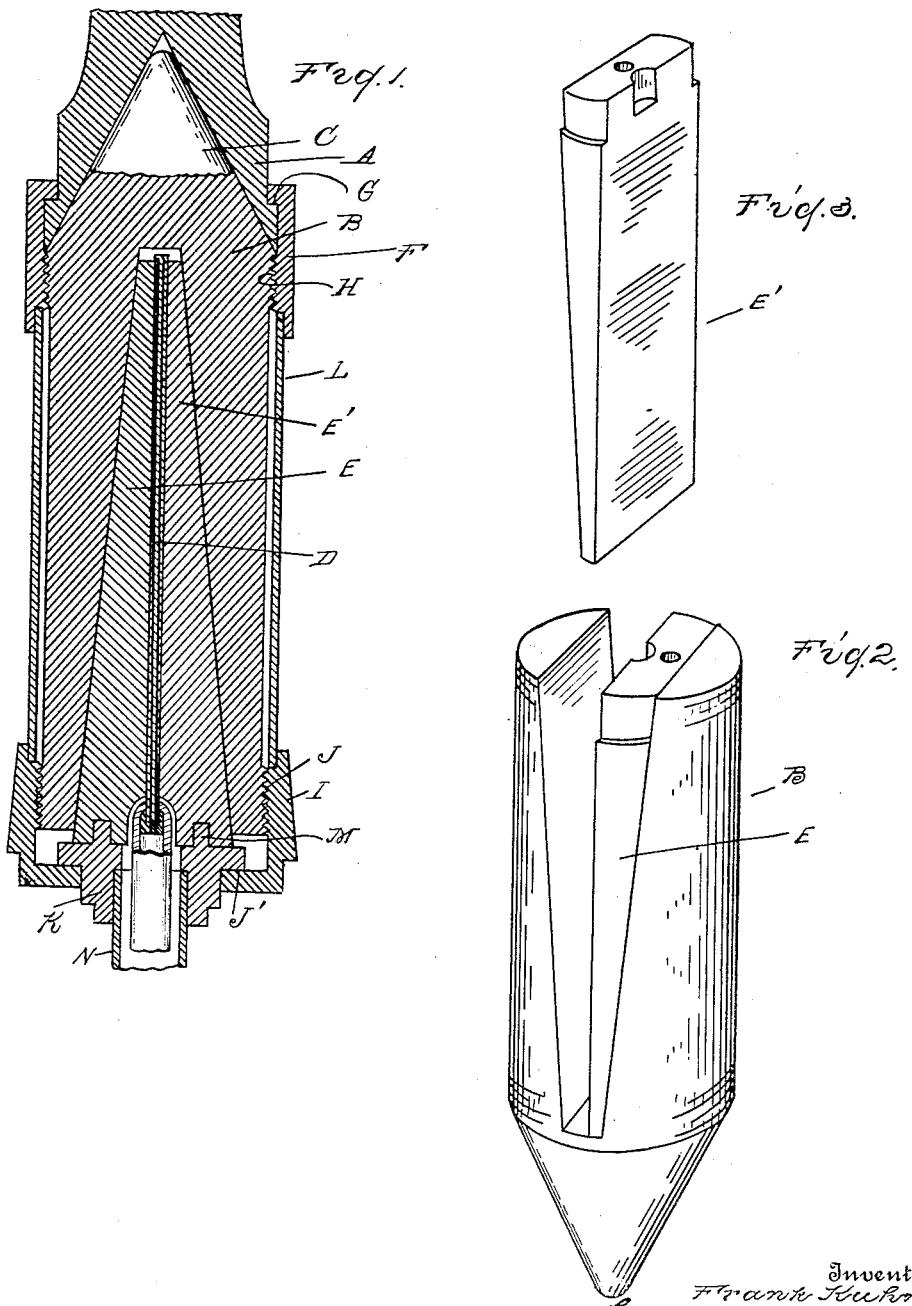
Inventors
Frank Kuhn
Lawrence H. Thomas
Jules G. Spiess
By Whittemore Hulbert & Whittemore
Attorneys

UNITED STATES PATENT OFFICE.

FRANK KUHN, LAWRENCE H. THOMAS, AND JULES G. SPIESS, OF DETROIT, MICHIGAN, ASSIGNORS TO AMERICAN ELECTRICAL HEATER COMPANY, OF DETROIT, MICHIGAN, A CORPORATION OF MICHIGAN.

ELECTRICALLY-HEATED TOOL.

1,353,965.     Specification of Letters Patent.     Patented Sept. 28, 1920.

Application filed May 27, 1920. Serial No. 384,512.

*To all whom it may concern:*

Be it known that we, FRANK KUHN and LAWRENCE H. THOMAS, both citizens of the United States of America, and JULES G. SPIESS, a citizen of the Republic of France, having taken out first citizenship papers in the United States of America, all residing at Detroit, in the county of Wayne and State of Michigan, have invented certain new and useful Improvements in Electrically-Heated Tools, of which the following is a specification, reference being had therein to the accompanying drawings.

The invention relates to electrically heated tools more particularly designed for use as soldering irons and of that type in which the tool proper may be easily removed and replaced. It is the object of the invention to obtain a construction in which good heat conduction is maintained between the heating unit and the tool. To this end the invention consists in the construction as hereinafter set forth.

In the drawings:

Figure 1 is a longitudinal section through the tool;

Fig. 2 is a perspective view of the heat conducting body with one of the wedges removed therefrom;

Fig. 3 is a similar view of the removed wedge.

A is the tool to be heated, which may be of the usual shape used for soldering irons. B is a heat conducting body which is provided at its end with a conical portion C for engaging a corresponding conical recess in the end of the tool. The body B is cylindrical and extends rearward from the tool, but is cut away centrally to form a longitudinally extending wedge-shaped recess with its large end toward the rear. D is a flat electrical heating unit, and E and E' are wedge-shaped members upon opposite sides of said unit, which are insertible in the wedge-shaped recess in the member B, having their outer surfaces parallel with and in contact with the walls of said recess. F is a clamping collar having a shouldered engagement with the tool, as indicated at G, and a threaded engagement with the member B, as indicated at H. I is a corresponding clamping collar having a threaded engagement at J with the opposite end of the body B and a shouldered engagement at J' with a clamping member K which bears against the large ends of the wedges E and E'. L is a tube extending between the collars F and I and spaced from the outer surface of the body B to break heat conduction therewith. M are pins on the member K engaging recesses in the wedges E and E' and preventing rotation of said member K when said collar I is turned. N is a tubular shank secured within said member K and extending rearward to the handle (not shown).

When the parts are assembled, the tightening of the collar F will hold the tool A in firm contact with the conical end C of the body B, while the tightening of the collar I will force the wedges E and E' longitudinally, thereby exerting a strong clamping pressure upon the unit. When heat is generated in this unit, it will be conducted outward through the wedges E and E' into the walls of the member B and as the latter is integral with the conical end B, the heat will be easily conducted to that point. From here it will pass through the contacting conical surface on the tool A. The pressure produced by the two clamps will maintain good heat conduction from the unit into the tool, thereby rapidly dissipating the heat and utilizing it where it is needed.

What we claim as our invention is:

1. The combination with a tool to be heated, of a heat-conducting body in alinement with said tool and having a surface parallel to the surface on said tool, said body being provided with a wedge-shaped longitudinally extending recess, a heating element in said recess, a wedge member also in said recess for clamping said heating element, and longitudinally adjustable means connecting said wedge member and tool to simultaneously clamp said parallel surfaces of the tool and body in contact with each other and the heating element in heat conducting contact with said body.

2. The combination with a tool to be heated, of a heat conducting body extending rearward from said tool and provided with a transverse surface parallel to and in contact with a corresponding surface on the tool, said body being also provided with a longitudinally extending wedge-shaped recess, a heating element in said recess, a wedge also in said recess for clamping said heating element, means for adjusting said wedge longitudinally with respect to said body to clamp the unit, and adjustable means between said body and tool for clamping the same with their parallel surfaces in heat conducting contact.

3. The combination with a tool to be heated, of a heat conducting body extending rearward therefrom and provided with an end surface parallel to an adjacent end surface on said tool and in contact therewith, said body having a central longitudinally extending recess, a flat heating unit arranged centrally within said recess, a pair of wedges respectively on opposite sides of said heating unit within said wedge-shaped recess, means for clamping said body to said tool, and means for adjusting said wedges in relation to said body to clamp said heating unit therebetween.

4. The combination with a tool to be heated having a conical recess in the rear end thereof, of a heat conducting body having a conical end parallel with and engaging said conical recess, said body having a central longitudinally extending wedge-shaped recess, a flat heating unit arranged centrally of said wedge-shaped recess, a pair of wedges respectively on opposite sides of said heating element within said wedge-shaped recess, means for clamping said tool to said body, and means for adjusting said wedges with respect to said body to clamp said heating element.

5. The combination with a tool to be heated provided with a conical recess in the rear end thereof, of a heat conducting body having a conical end portion for fitting within and parallel to said recess, said body having a central longitudinally extending wedge-shaped recess, a clamping collar extending between said tool and body having a shouldered engagement with one and a threaded engagement with the other to effect a clamping of said contacting surfaces, a flat heating unit in said wedge shaped recess, a pair of wedges respectively on opposite sides of said flat unit within said recess, and a collar forming a connection between said wedges and body, having a shouldered engagement with one and a threaded engagement with the other, whereby said heating unit may be clamped in heat-conducting contact with said body.

In testimony whereof we affix our signatures.

FRANK KUHN.
LAWRENCE H. THOMAS.
JULES G. SPIESS.